United States Patent
Galvan et al.

(10) Patent No.: US 9,752,023 B2
(45) Date of Patent: *Sep. 5, 2017

(54) PROCESS FOR THE PREPARATION OF HETEROPHASIC PROPYLENE POLYMER COMPOSITIONS

(71) Applicant: Basell Poliolefine Italia S.r.l., Milan (IT)

(72) Inventors: Monica Galvan, Ferrara (IT); Roberto Pantaleoni, Ferrara (IT); Ofelia Fusco, Ferrara (IT); Benedetta Gaddi, Ferrara (IT); Andreas Neumann, Ferrara (IT); Antonio Mazzucco, Ferrara (IT); Gianni Collina, Ferrara (IT); Marco Ciarafoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/358,753

(22) PCT Filed: Nov. 7, 2012

(86) PCT No.: PCT/EP2012/071974
§ 371 (c)(1),
(2) Date: May 16, 2014

(87) PCT Pub. No.: WO2013/072225
PCT Pub. Date: May 23, 2013

(65) Prior Publication Data
US 2014/0316069 A1    Oct. 23, 2014

Related U.S. Application Data

(60) Provisional application No. 61/561,688, filed on Nov. 18, 2011.

(30) Foreign Application Priority Data

Nov. 17, 2011  (EP) .................................. 11189458

(51) Int. Cl.
C08L 23/12    (2006.01)
C08F 10/06    (2006.01)

(52) U.S. Cl.
CPC ............. *C08L 23/12* (2013.01); *C08F 10/06* (2013.01)

(58) Field of Classification Search
CPC .......... C08L 23/10; C08L 23/12; C08L 23/08; C08L 23/0807; C08F 4/00; C08F 4/022; C08F 4/651; C08F 4/6543
See application file for complete search history.

(56) References Cited

U.S. PATENT DOCUMENTS

| | | | |
|---|---|---|---|
| 4,399,054 A * | 8/1983 | Ferraris et al. ................ | 502/125 |
| 9,068,028 B2 * | 6/2015 | Collina et al. | |
| 9,068,029 B2 * | 6/2015 | Collina et al. | |
| 2009/0326172 A1 * | 12/2009 | Standaert ................ | C08F 10/06 526/64 |

FOREIGN PATENT DOCUMENTS

| | | |
|---|---|---|
| WO | WO 0063261 A1 * | 10/2000 |
| WO | WO 03046021 A1 * | 6/2003 |
| WO | WO2010/146074 A1 | 12/2010 |
| WO | WO2011/061134 A1 | 5/2011 |
| WO | WO-2012049204 A1 | 4/2012 |

OTHER PUBLICATIONS

PCT International Search Report & Written Opinion mailed Apr. 4, 2013, for PCT/EP2012/071974.

* cited by examiner

*Primary Examiner* — Irina S Zemel
*Assistant Examiner* — Jeffrey Lenihan

(57) ABSTRACT

Preparing propylene polymer compositions comprising 50 to 90% by weight of a propylene (co)polymer, and 10 to 50% by weight of an ethylene copolymer. The polymerization process includes, in the presence of a catalyst system:
 (i) a first step of polymerizing propylene to produce the propylene (co)polymer; and
 (ii) a successive gas-phase polymerization step performed in the presence of the propylene (co)polymer, ethylene, and one or more α-olefins to produce the ethylene copolymer.

The catalyst system contains the product obtained by contacting:
(a) a solid catalyst component comprising at least two internal electron donor compounds, a succinate and a 1,3-diether;
(b) an aluminum hydrocarbyl compound, and
(c) optionally, an external electron donor compound.

6 Claims, No Drawings

PROCESS FOR THE PREPARATION OF HETEROPHASIC PROPYLENE POLYMER COMPOSITIONS

This application is the U.S. National Phase of PCT International Application PCT/EP2012/071974, filed Nov. 7, 2012, claiming priority of European Patent Application No. 11189458.0, filed Nov. 17, 2011, and the benefit under 35 U.S.C. 119(e) of U.S. Provisional Application No. 61/561,688filed Nov. 18, 2011, the contents of which are incorporated herein by reference in their entirety.

FIELD OF THE INVENTION

The present invention relates to a polymerization process for the preparation of heterophasic propylene polymer compositions and to molded articles obtained thereby having good impact resistance.

BACKGROUND OF THE INVENTION

Impact-resistant heterophasic propylene polymer compositions are well known in the art. Typically, they comprise a relatively high crystalline propylene polymer fraction mostly insoluble in xylene at 25° C., and a relatively low crystallinity copolymer fraction being highly soluble in xylene at 25° C. The relatively high crystallinity fraction is generally a propylene homopolymer, or a random propylene copolymer with a relatively low amount of olefin comonomer, characterized by high isotacticity. The relatively low crystallinity fraction is generally a propylene copolymer and particularly a propylene-ethylene copolymer having a content of ethylene ranging from 15 to 75% by weight. Those heterophasic compositions can be prepared by several methods, including the mechanical blend of the two components. The preferred method, however, is the preparation in-reactor by a sequence of polymerization step carried out in one or two reactors. Usually, in a first step propylene is polymerized alone or copolymerized with a small amount of other olefins in order to produce the high crystallinity fraction, while in a second step carried out under different polymerization conditions, in the presence of relatively high amount of other olefin comonomer, the xylene-soluble fraction is produced.

This method is largely used industrially and it is preferably carried out by operating in two different reactors which can be based on the same or different polymerization technology. In particular, the first step can be carried out in a liquid phase reactor or in gas-phase reactor, while the second step is commonly carried out in gas-phase in order to avoid the dissolution of the low crystallinity fraction in the reaction bath.

In this type of process the performances of the catalyst is very important. The catalyst system should be able to produce both a highly isotactic propylene (co)polymer in the first step, and in the second step a copolymer in which the comonomer units are sufficiently well distributed along and among the polymer chains in order for the resulting copolymer to have a low crystallinity, i.e. high solubility in xylene, which confers impact resistance to the composition. Of course, it is simultaneously requested a high polymerization activity in order to maintain at an acceptable level the plant productivity. Due to the presence of multiple polymerization step and to the fact that a certain weight balance among the two polymer fractions must be kept, the catalyst needs to maintain an acceptable level of polymerization activity over the time and in particular it should be able to maintain the necessary level of reactivity in gas-phase. Moreover, the catalyst should have the necessary morphological versatility to withstand the initial stage of polymerization where the crystalline polymer is produced while at the same time maintaining the capability to prevent that in a successive step the soluble polymer fraction exits the polymer/catalyst growing granule and adheres to the reactor.

The foregoing explanations make it clear that the required catalyst system is requested of performances and versatility which are quite demanding and difficult to be found in a single catalyst. In fact, WO2003/054035 teaches to use a combination of two different catalysts in order to have simultaneously high productivity and sufficient porosity for the preparation of the soluble polymer fraction. The use of catalyst mixtures, however, introduces some complexity into the catalyst-handling section of the plant which would require more devices in order to correctly use them. Moreover, as each single catalyst of the mixture is produced by a distinct batch run, the likelihood to have variations on the final catalyst is doubled and so is the likelihood to have of a polymer composition out of specification. Moreover, due to the presence of different polymerization stages under different conditions, the behavior of a combination of catalysts is hardly predictable. In fact, each catalyst may have a different behavior under certain polymerization conditions and the specific results would need to be checked. A mixture of catalysts may, for example, have an excellent activity but poor behavior in terms of xylene-soluble polymer material incorporation.

Accordingly, documents that only generically disclose suitability of catalysts or mixture of catalysts for preparation of impact propylene copolymers do not actually convey any concrete teaching in the absence of working examples. This is the case for example of WO2007/147864 and WO2007/147865. The first document suggests using a blend of two Ziegler-Natta catalysts containing two different donors, a succinate and a diether respectively. The second teaches to use a single catalyst containing a blend of the said two donors. In both cases the target was the obtainment of a propylene polymer product having characteristics intermediate among those of the products obtained by the use of the catalysts based on the individual donor. Said documents mention very generally, without any concrete example, that the proposed solution could be suitable for production of propylene heterophasic copolymers. They do not offer any concrete indications on how to prepare the catalysts.

In WO2010/146074 and WO2011/061134 the inventors set out to provide improved processes for preparing heterophasic polypropylene compositions by employing catalyst systems based on a solid catalyst component having average particle size ranging from 15 to 80 μm comprising a magnesium halide, a titanium compound having at least a Ti-halogen bond and at least two electron donor compounds one of which being present in an amount from 50 to 90% by mol with respect to the total amount of donors and selected from succinates and the other being selected from 1,3-diethers. Propylene polymer compositions obtained according to both those documents are said to be characterized by an excellent impact resistance/rigidity balance.

There is however still room for improvement in processes for the preparation of impact resistant polypropylene compositions, particularly by providing a high efficiency process able to deliver compositions with further improved impact properties.

SUMMARY OF THE INVENTION

Thus, according to a first object, the present invention relates to a process for the preparation of propylene polymer compositions comprising from 50 to 90% by weight of a propylene (co)polymer fraction insoluble in xylene at 25° C., and from 10 to 50% by weight of an ethylene copolymer fraction soluble in xylene at 25° C., said process comprising:
(i) a first step of polymerizing propylene in the optional presence of ethylene and/or $C_4$-$C_{10}$ alpha olefins, to produce a propylene (co)polymer being for at least 85% by weight insoluble in xylene at 25° C.; and
(ii) a successive step, carried out in gas-phase, in the presence of the product coming from step (i), of copolymerizing a mixture of ethylene with one or more α-olefins $CH_2$=CHR in which R is a hydrocarbon radical having 1-10 carbon atoms, to produce an ethylene copolymer;
the process being carried out in the presence of a catalyst system comprising: the product obtained by contacting:
(a) a solid catalyst component comprising a magnesium halide, a titanium compound having at least a Ti-halogen bond and at least two internal electron donor compounds one of which being present in an amount from 35 to 90% by mol with respect to the total amount of donors and being selected from succinates and the other being selected from 1,3-diethers, the total amount of internal electron donor compounds being lower than 14.0% by weight with respect to the total weight of the solid catalyst component; with
(b) an aluminum hydrocarbyl compound, and optionally with
(c) an external electron donor compound.

DETAILED DESCRIPTION OF THE INVENTION

In the solid catalyst component (a) the succinate internal donor is preferably selected from succinates of formula (I) below:

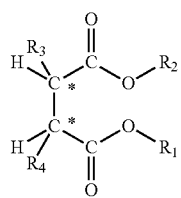

(I)

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, C3-C20 cycloalkyl, C5-C20 aryl, arylalkyl or alkylaryl group, with the proviso that at least one of them is a branched alkyl; said compounds being, with respect to the two asymmetric carbon atoms identified in the structure of formula (I), stereoisomers of the type (S,R) or (R,S).

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the $R_3$ and/or $R_4$ radicals are secondary alkyls like isopropyl, sec-butyl, 2-pentyl, 3-pentyl or cycloakyls like cyclohexyl, cyclopentyl, cyclohexylmethyl.

Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above, particularly preferred are the compounds of formula (II)

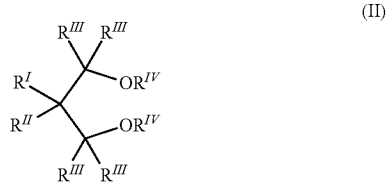

(II)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3- dimethoxypropane, 2,2-bis(2-ethylhexyl)-1,3-dimethoxypropane,2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3 -dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, particularly preferred are the 1,3-diethers of formula (III):

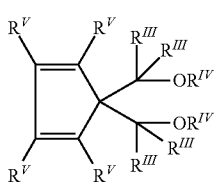

(III)

where the radicals $R^{IV}$ have the same meaning explained above and the radicals $R^{III}$ and $R^{V}$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^{V}$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^{V}$ and $V_{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^{V}$ radicals are bonded to each other to form one or more condensed cyclic structures, preferably benzenic, optionally substituted by $R^{VI}$ radicals. Specially preferred are the compounds of formula (IV):

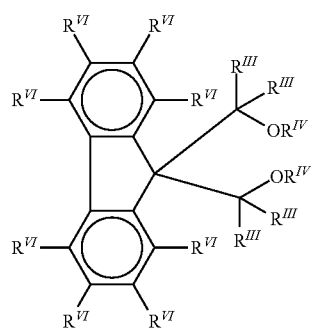

(IV)

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (II).

Specific examples of compounds comprised in formulae (II) and (III) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As explained above, the catalyst component (a) comprises, in addition to the above electron donors, a titanium compound having at least a Ti-halogen bond and a magnesium halide. The magnesium halide is preferably $MgCl_2$ in active form which is widely known from the patent literature as a support for Ziegler-Natta catalysts. Patents U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n-1 X is halogen and R is a hydrocarbon radical having from 1 to 10 carbon atoms.

Preferably, the catalyst component (a) has an average particle size ranging from 15 to 80 μm, more preferably from 20 to 70 μm and even more preferably from 25 to 65 μm.

As explained, the succinate is present in an amount ranging from 35 to 90% by moles with respect to the total amount of donors. Preferably it ranges from 45 to 85% by moles and more preferably from 65 to 80% by moles. The 1,3-diether preferably constitutes the remaining amount with respect to the total amount of donors in the solid catalyst component (a).

The total amount of internal electron donor compounds, including the succinate and the 1,3-diether, is lower than 14.0% by weight, preferably lower than 13.5% by weight, more preferably lower than 13.0% by weight, even more preferably lower than 12.5% by weight, with respect to the total weight of the solid catalyst component (a).

The aluminum hydrocarbyl compound (b) is preferably chosen among the trialkyl aluminum compounds such as for example triethylaluminum, tri-n-hexylaluminum, tri-n-octylaluminum. It is also possible to use mixtures of trialkylaluminums with alkylaluminum halides, alkylaluminum hydrides or alkylaluminum sesquichlorides such as $AlEt_2Cl$ and $Al_2Et_3Cl_3$.

Suitable external electron-donor compounds (c) include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-2-ethylpiperidinyl-dimethoxysilane and 1,1,1,trifluoropropyl-metil-dimethoxysilane. When present, the external electron donor compound is used in such an amount to give a molar ratio between the organo-aluminum compound and said electron donor compound of from 5 to 500, preferably from 7 to 400 and more preferably from 10 to 200.

The catalyst-forming components are preferably contacted with a liquid inert hydrocarbon solvent such as, e.g., propane, n-hexane or n-heptane, at a temperature below about 60° C. and preferably from about 0 to 30° C. for a time period of from about six seconds to 60 minutes.

The above catalyst components (a), (b) and optionally (c) are generally fed to a pre-contacting vessel, in amounts such that the weight ratio (b)/(a) is in the range of 01-10 and, if the compound (c) is present, the weight ratio (b)/(c) is preferably as defined above. Preferably, the said components are pre-contacted at a temperature of from 10 to 20° C. for 1-30 minutes. The precontact vessel can be either a stirred tank or a loop reactor.

Preferably, the precontacted catalyst is then fed to a prepolymerization reactor where a prepolymerization step takes place. The prepolymerization step can be carried out in a first reactor selected from a loop reactor or a continuously stirred tank reactor, and is generally carried out in liquid-phase. The liquid medium comprises liquid alpha-olefin monomer(s), optionally with the addition of an inert hydrocarbon solvent. Said hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the total amount of alpha-olefins, preferably lower than 20% by weight. Preferably, step (i)a is carried out in the absence of inert hydrocarbon solvents.

The average residence time in this reactor generally ranges from 2 to 40 minutes, preferably from 10 to 25 minutes. The temperature ranges between 10° C. and 50° C., preferably between 15° C. and 35° C. Adopting these conditions allows obtaining a pre-polymerization degree in the preferred range from 60 to 800 g per gram of solid catalyst component, preferably from 150 to 500 g per gram of solid catalyst component. The prepolymerization step is further characterized by a low concentration of solid in the slurry, typically in the range from 50 g to 300 g of solid per liter of slurry.

The slurry containing the catalyst, preferably in pre-polymerized form, is fed to a gas-phase or liquid-phase polymerization reactor where step (i) takes place. In case of a gas-phase reactor, it generally consists of a fluidized or stirred, fixed bed reactor or a reactor comprising two interconnected polymerization zones one of which, working under fast fluidization conditions and the other in which the polymer flows under the action of gravity. The liquid phase process can be either in slurry, solution or bulk (liquid monomer). This latter technology is the most preferred and can be carried out in various types of reactors such as continuous stirred tank reactors, loop reactors or plug-flow ones. The polymerization is generally carried out at temperature of from 20 to 120° C., preferably of from 40 to 85° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Preferably, the polymerization step (i) is carried out by polymerizing propylene in liquid monomer, optionally in mixture with ethylene and/or $C_4$-$C_{10}$ alpha olefins, more preferably in a loop reactor, to give the propylene polymer of the required xylene insolubility.

In this step and/or in the successive polymerization step, hydrogen can be used as a molecular weight regulator.

The propylene polymer obtained in this polymerization step has a xylene insolubility preferably higher than 90% and more preferably higher than 95%. The Melt Flow Rate value according to ISO 1133 (230° C., 2.16 Kg) can vary within a wide range going from 0.01 to 300 g/10 min and particularly from 0.1 to 250 g/10 min.

In the second step, preferably the ethylene copolymer is produced in a conventional fluidized-bed gas-phase reactor in the presence of the polymeric material and of the catalyst system coming from the preceding polymerization step. The polymerization mixture coming from the first polymerization step is discharged to a gas-solid separator, and subsequently fed to the fluidized-bed gas-phase reactor operating under conventional conditions of temperature and pressure.

The polymer produced in the second polymerization step is preferably an ethylene copolymer containing from 15 to 75% wt of a C3-C10 alpha olefin, optionally containing minor proportions of a diene, being for at least 60% soluble in xylene at room temperature. Preferably the alpha olefin is selected from propylene or butene-1, more preferably being propylene, and its content ranges preferably from 20 to 70% by weight.

The final polymer composition obtained through the process of the invention preferably comprises 30-90 parts by weight, preferably 40-80 parts by weight of (A) a propylene polymer optionally containing minor amounts of ethylene and/or $C_4$-$C_{10}$ alpha olefins being insoluble in xylene at 25° C. and 10-70 parts by weight, preferably 20-60 parts by weight, of (B) an ethylene copolymer soluble in xylene preferably containing from 20 to 70% of C3-C10 alpha olefin.

The total ethylene content in the final polymer composition is suitably higher than 5% by weight, preferably comprised between 6 and 10% by weight.

The value of the intrinsic viscosity of the xylene soluble fraction determined on the reactor grade polymer composition ranges from 0.5 dl/g to 6.0 dl/g, preferably from 1.5 dl/g to 3.5 dl/g, more preferably from 2 dl/g to 3 dl/g.

The compositions obtained according to the process of the invention as reactor grade have Melt Flow Rate values according to ISO 1133 (230° C., 2.16 Kg) generally ranging from 0.01 to 100 g/10 min, preferably from 0.1 to 70 g/10 min and more preferably from 0.2 to 60 g/10 min. If desired, they can be visbroken according to known technique in order to reach the final MFR value suited for the selected application. The chemical degradation of the polymer (visbreaking) is carried out in the presence of free radical initiators, such as peroxides. Examples of radical initiators that can be used for this purpose are 2,5-dimethyl-2,5-di(tert-butylperoxide)-hexane and dicumyl-peroxide. The degradation treatment is carried out by using the appropriate quantities of free radical initiators, and preferably takes place in an inert atmosphere, such as nitrogen. Methods, apparatus, and operating conditions known in the art can be used to carry out this process.

The compositions of the invention are characterized by excellent impact resistance. They show good values of impact strength tested at different temperatures. Quite interestingly, they show improved results on impact test for containers with respect to the compositions of the prior art.

The compositions of the invention show values of flexural modulus generally higher than 900 MPa, preferably higher than 1200 Mpa.

Other preferred features of the composition obtained by the process of the invention are:
- a molecular weight distribution in component (A), expressed by the $\overline{M}w/\overline{M}n$ ratio, measured by GPC, equal to or higher than 5, typically comprised between 6 and 10;
- a value of $\overline{M}z/\overline{M}w$ ratio in component (A), measured by GPC, equal to or higher than 2.5, typically comprised between 2.5 and 4.5, more typically between 3 and 4.

The compositions of the present invention can contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as flexural modulus and HDT. Talc can also have a nucleating effect.

The compositions of the present invention can be used to prepare molded articles endowed with excellent impact behavior.

Thus, another object of the invention is a molded article obtained from a propylene polymer composition comprising from 50 to 90% by weight of a propylene (co)polymer fraction insoluble in xylene at 25° C., and from 10 to 50% by weight of an ethylene copolymer fraction soluble in xylene at 25° C., said propylene polymer composition being obtainable by a process comprising:
(i) a first step of polymerizing propylene in the optional presence of ethylene and/or $C_4$-$C_{10}$ alpha olefins, to produce a propylene (co)polymer being for at least 85% by weight insoluble in xylene at 25° C.; and
(ii) a successive step, carried out in gas-phase, in the presence of the product coming from step (i), of copolymerizing a mixture of ethylene with one or more α-olefins $CH_2$=CHR in which R is a hydrocarbon radical having 1-10 carbon atoms, to produce an ethylene copolymer;
the process being carried out in the presence of a catalyst system comprising: the product obtained by contacting:
(a) a solid catalyst component comprising a magnesium halide, a titanium compound having at least a Ti-halogen bond and at least two internal electron donor compounds one of which being present in an amount from 35 to 90% by mol with respect to the total amount of donors and being selected from succinates and the other being selected from 1,3-diethers, the total amount of internal electron donor compounds being lower than 14.0% by weight with respect to the total weight of the solid catalyst component; with
(b) an aluminum hydrocarbyl compound, and optionally with
(c) an external electron donor compound.

The thus obtained molded articles, due to their excellent impact properties, particularly at low temperatures, are suitable for use as food containers, particularly as containers for storing food in a refrigerator.

The following examples are given to illustrate the present invention without any limiting purpose.

EXAMPLES

Methods

Molar Ratio of Feed Gases

Determined by gas-chromatography.

Average Particle Size of the Adduct and Catalysts

Determined by a method based on the principle of the optical diffraction of monochromatic laser light with the "Malvern Instr. 2600" apparatus. The average size is given as P50.

The characterization data for the propylene polymer compositions and for manufactured articles obtained thereby were obtained according to the following methods:

Xylene-Soluble Fraction

Determined as follows: 2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Comonomer (C2) Content

Determined by IR spectroscopy. The comonomer content of the ethylene copolymer fraction is determined on the precipitated "amorphous" fraction of the polymer. The precipitated "amorphous" fraction is obtained as follows: to one 100 ml aliquot of the filtered liquid obtained as described above 200 ml of acetone are added under vigorous stirring. Precipitation must be complete as evidenced by a clear solid-solution separation. The solid thus obtained is filtered on a metallic screen and dried in a vacuum oven at 70° C. until a constant weight is reached.

Melt Flow Rate (MFR)

Determined according to ISO 1133 (230° C., 2.16 Kg)

Intrinsic Viscosity

Determined in tetrahydronaphthalene at 135° C.

Stress at Yield and at Break

Determined according to ISO 527

Elongation at Yield and Break

Determined according to ISO 527

IZOD Impact Strength

Determined according to ISO 180/1A

Multi-Axial Instrumented Impact

Determined according to ISO 6603-2

Example 1

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2.2.1C_2H_5OH$ having average particle size of 47 μm (prepared in accordance with the method described in example 1 of EP728769) and an amount of diethyl 2,3-diisopropylsuccinate such as to have a Mg/succinate molar ratio of 15 were added. The temperature was raised to 100° C. and kept at this value for 60 min. After that the stirring was stopped and the liquid was siphoned off. After siphoning, fresh $TiCl_4$ and an amount of 9,9-bis(methoxymethyl)fluorene such as to have a Mg/diether molar ratio of 30 were added. Then the temperature was raised to 110° C. and kept for 30 minutes under stirring. After sedimentation and siphoning at 85° C., fresh TiCl4 was added. Then the temperature was raised to 90° C. for 15 min. After sedimentation and siphoning at 90° C. the solid was washed six times with anhydrous hexane (6×100 ml) at 60° C. The obtained solid catalyst component had a total amount of internal electron donor compounds of 12.0% by weight with respect to the weight of the solid catalyst component.

Preparation of the Catalyst System

Before introducing it into the polymerization reactors, the solid catalyst component described above is contacted with aluminum-triethyl (TEAL) and with dicyclopentyl-dimetoxysilane (DCPMS) under the conditions reported in Table 1.

Prepolymerization

The catalyst system is then subject to prepolymerization treatment at 20° C. by maintaining it in suspension in liquid propylene for a residence time of 9 minutes before introducing it into the polymerization reactor.

Polymerization

The polymerization run is conducted in continuous mode in a series of two reactors equipped with devices to transfer the product from one reactor to the one immediately next to it. The first reactor is a liquid phase loop reactor, and the second is a fluidized bed gas-phase reactor. A propylene homopolymer is prepared in the liquid loop reactor while an ethylene copolymer is prepared in the gas-phase reactor in the presence of the propylene homopolymer coming from the first stage. Hydrogen is used as molecular weight regulator. The gas phase (propylene, ethylene and hydrogen) is continuously analyzed via gas-chromatography. At the end of the run the powder is discharged and dried under a nitrogen flow.

The main polymerization conditions are reported in Table 1. The analytical data relating to the polymers produced in the different reactors and to the final compositions are reported in Table 2.

Comparative Example 1

It was worked according to Example 1, except that for the preparation of the solid catalyst component an amount of diethyl 2,3-diisopropylsuccinate such as to have a Mg/succinate molar ratio of 12 and an amount of 9,9-bis(methoxymethyl)fluorene such as to have a Mg/diether molar ratio of 24 were added. The obtained solid catalyst component had a total amount of internal electron donor compounds of 14.5% by weight with respect to the weight of the solid catalyst component.

The main polymerization conditions are reported in Table 1. The analytical data relating to the polymers produced in the different reactors and to the final compositions are reported in Table 2.

Comparative Example 2

It was worked according to Example 1, except that the solid catalyst component was prepared as follows:

Preparation of the Solid Catalyst Component

Into a 500 mL four-necked round flask, purged with nitrogen, 250 ml of $TiCl_4$ were introduced at 0° C. While stirring, 10.0 g of microspheroidal $MgCl_2.1.8C_2H_5OH$ (prepared according to the method described in example 2 of U.S. Pat. No. 4,399,054 but operating at 3000 rpm instead of 10000 rpm) and 9.1 mmol of diethyl-2,3-(diisopropyl)succinate were added. The temperature was raised to 110° C. and maintained for 120 min. Then, the stirring was discontinued, the solid product was allowed to settle and the supernatant liquid was siphoned off. Then the following operations were repeated twice: 250 ml of fresh $TiCl_4$ were added, the mixture was reacted at 120° C. for 60 min and the supernatant liquid was siphoned off. The solid was washed six times with anhydrous hexane (6×100 mL) at 60° C. The main polymerization conditions are reported in Table 1. The analytical data relating to the polymers produced in the different reactors and to the final compositions are reported in Table 2.

It can be seen that the polymers obtained from the process of the invention show better impact properties, particularly at low temperature, making them suitable for the manufacture of containers for use at low temperature, such as food containers for refrigerator storage.

TABLE 1

Polymerization conditions

| | Example 1 | Comp. 1 | Comp. 2 |
|---|---|---|---|
| Precontact | | | |
| Temperature ° C. | 12 | 15 | 12 |
| Residence time (min) | 19 | 20 | 19 |
| Teal/donor ratio by wt | 5 | 10 | 5 |
| Prepolymerization | | | |
| Temperature ° C. | 20 | 20 | 20 |
| Residence time (min) | 9.2 | 9.2 | 9.2 |
| Pre-polymerization degree g/gcat | ~300 (*) | ~300 (*) | ~300 (*) |
| Loop 1$^{st}$ reactor in liquid phase - propylene homopolymerization | | | |
| Temperature, ° C. | 70 | 70 | 70 |
| Pressure, bar | 39 | 40 | 42 |
| Residence time, min | 75 | 65 | 70 |
| H$_2$ feed mol, ppm | 4200 | 4000 | 7300 |
| Gas-Phase reactor - ethylene/propylene copolymerization | | | |
| Temperature, ° C. | 80 | 80 | 81 |
| Pressure, bar | 15 | 15 | 14 |
| Residence time, min | 24 | 25 | 20 |
| C$_2^-$/C$_2^-$ + C$_3^-$, % | 0.27 | 0.29 | 0.32 |
| H$_2$/C$_2^-$, % | 0.079 | 0.08 | 0.100 |

Notes:
C$_2^-$ = ethylene; C$_3^-$ = propylene; H$_2$ = hydrogen; Split = amount of polymer prepared in the concerned reactor referred to the total weight;
(*) = Estimated value

TABLE 2

Polymer characterization

| | | Example 1 | Comp. 1 | Comp. 2 |
|---|---|---|---|---|
| Component A) | | | | |
| Homopolymer content | % | 79 | 80 | 81 |
| MFR "L" | g/10' | 88 | 104 | 100 |
| Xylene soluble fraction | % | 1.8 | 1.9 | 2.1 |
| Component B) | | | | |
| Copolymer content | % | 21 | 20 | 19 |
| Ethylene content in copolymer | % | 40 | 40 | 41 |
| Composition | | | | |
| MFR "L" | g/10' | 41 | 46 | 46 |
| Ethylene content | % | 8.5 | 7.4 | 7.7 |
| Xylene soluble fraction | % | 20.3 | 18.2 | 18.5 |
| Intrinsic viscosity of the Xylene soluble fraction | % | 2.48 | 2.37 | 2.08 |
| Izod Impact Notched @ 23° C. | KJ/m$^2$ | 6.4 | 4.8 | 3.7 |
| Izod Impact Notched @ 0° C. | KJ/m$^2$ | 5.2 | 4.6 | 3.1 |
| Izod Impact Notched @ -20° C. | KJ/m$^2$ | 4.4 | 3.8 | 2.8 |
| Tensile strength at yield | MPa | 24.0 | 26.3 | 27.1 |
| Elongation strength at yield | % | 4.6 | 4.8 | 4.9 |
| Tensile strength at break | MPa | 19.7 | 21.3 | 23.9 |
| Elongation strength at break | % | 58 | 43 | 14 |
| Multi-Axial Instrumented Impact - Energy @ 23° C. | J | 41 | 32 | 29 |
| Multi-Axial Instrumented Impact - Break type @ 23° C. | * | 8YD-2YS | 1YS-8YU-1NY | 10YU |
| Multi-Axial Instrumented Impact - Energy @ 0° C. | J | 49 | 19.7 | 14 |
| Multi-Axial Instrumented Impact - Break type @ 0° C. | * | 4YD-6YS | 10NY | 10NY |
| Multi-Axial Instrumented Impact - Energy @ -10° C. | J | 49 | 17 | 15 |
| Multi-Axial Instrumented Impact - Break type @ -10° C. | * | 3YD-5YS-2YU | 10NY | 10NY |

* YD = Yielding deep drawing; YS = Yielding stable cracking; YU = Yielding unstable cracking; NY = no yielding.

What is claimed is:

1. A process for the preparation of a propylene polymer composition comprising:
    (A) 50-90% by weight of a propylene (co)polymer, wherein the propylene (co)polymer contains a fraction that is insoluble in xylene at 25° C., and
    (B) 10-50% by weight of an ethylene copolymer, wherein the ethylene copolymer contains a fraction that is soluble in xylene at 25° C.;
    wherein the propylene polymer composition has a total ethylene content from 5-10 wt. %, based upon the total weight of the propylene polymer composition, and a flexural modulus greater than 1200 MPa;
    said process comprising:
    (i) a first step of polymerizing propylene in the optional presence of ethylene and/or C$_4$-C$_{10}$ alpha olefins, to produce the propylene (co)polymer, wherein the propylene (co)copolymer contains a fraction that is insoluble in xylene at 25° C.; and
    (ii) a successive gas-phase copolymerizing step, carried out in the presence of the propylene (co)polymer, a mixture of ethylene and one or more α-olefins CH$_2$=CHR in which R is a hydrocarbon radical having 1-10 carbon atoms, to produce the ethylene copolymer;
    the process being carried out in the presence of a catalyst system comprising the product obtained by contacting:
    (a) a solid catalyst component comprising a magnesium halide, a titanium compound having at least a Ti-halogen bond and at least two internal electron donor compounds,
        wherein the at least two internal electron donor compounds comprise a succinate as a first internal electron donor present in an amount from 35-90% by mol with respect to the total amount of internal electron donor compounds present in the solid catalyst component, and a 1,3-diether comprises the second internal electron donor, wherein the total concentration of the internal electron donors is lower than 14.0% by weight with respect to the total weight of the solid catalyst component;
    (b) triethylaluminum; and
    (c) optionally, an external electron donor compound at a molar ratio of 5-500 with respect to triethylaluminum.

2. The process according to claim 1, wherein the catalyst component (a) has an average particle size ranging from 15 to 80 μm.

3. The process according to claim 1, wherein the succinate is present in amount ranging from 45 to 90% by mol with respect to the total amount of internal donors.

4. The process according to claim 1, wherein step (i) is carried out in liquid propylene.

5. A molded article obtained from a propylene polymer composition produced by the process of claim 1.

6. The molded article of claim 5, wherein the molded article is a food storage container.

* * * * *

UNITED STATES PATENT AND TRADEMARK OFFICE
CERTIFICATE OF CORRECTION

PATENT NO. : 9,752,023 B2  
APPLICATION NO. : 14/358753  
DATED : September 5, 2017  
INVENTOR(S) : Monica Galvan et al.

Page 1 of 1

It is certified that error appears in the above-identified patent and that said Letters Patent is hereby corrected as shown below:

In the Specification

| | | |
|---|---|---|
| Column 1 | Line 10 | Delete "61/561,688filed" and insert --61/561,688 filed-- |
| Column 3 | Line 52 | Delete "C3-C20" and insert --$C_3$-$C_{20}$-- |
| Column 3 | Line 53 | Delete "C5-C20" and insert --$C_5$-$C_{20}$-- |
| Column 3 | Line 66 | Delete "cycloakyls" and insert --cycloalkyls-- |
| Column 5 | Line 9 | Delete "1,3-dimetoxypropane," and insert --1,3-dimethoxypropane,-- |
| Column 5 | Line 10 | Delete "1,3 -dimetoxypropane," and insert --1,3-dimethoxypropane,-- |
| Column 5 | Line 13 | Delete "1,3-dimetoxypropane," and insert --1,3-dimethoxypropane,-- |
| Column 5 | Line 40 | Delete "$V_{VI}$" and insert --$R^{VI}$-- |
| Column 7 | Line 44 | Delete "1,1,1,trifluoropropyl-2-ethylpiperidinyl-dimethoxysilane and 1,1,1,trifluoropropyl-metil-dimethoxysilane." and insert --1,1,1-trifluoropropyl-2-ethylpiperidinyl-dimethoxysilane and 1,1,1-trifluoropropyl-metil-dimethoxysilane.-- |
| Column 8 | Line 65 | Delete "C3-C10" and insert --$C_3$-$C_{10}$-- |
| Column 9 | Line 11 | Delete "C3-C10" and insert --$C_3$-$C_{10}$-- |
| Column 9 | Line 49 | Delete "$\overline{Mw}/\overline{Mn}$" and insert --$\overline{M_w}/\overline{M_n}$-- |
| Column 9 | Line 52 | Delete "$\overline{Mz}/\overline{Mw}$" and insert --$\overline{M_z}/\overline{M_w}$-- |
| Column 11 | Line 51 | Delete "TiCl4" and insert --$TiCl_4$-- |
| Column 11 | Line 61 | Delete "dicyclopentyl-dimetoxysilane" and insert --dicyclopentyl-dimethoxysilane-- |

Signed and Sealed this  
Twenty-eighth Day of January, 2020

Andrei Iancu  
*Director of the United States Patent and Trademark Office*